United States Patent [19]

Aumard

[11] Patent Number: 4,892,163

[45] Date of Patent: Jan. 9, 1990

[54] WEIGHING DEVICE FOR STRAIN GAUGES

[75] Inventor: Jean-Pierre Aumard, Annemasse, France

[73] Assignee: Scaime, Annemasse, France

[21] Appl. No.: 334,702

[22] Filed: Apr. 6, 1989

[30] Foreign Application Priority Data

Apr. 12, 1988 [CH] Switzerland ................ 1341

[51] Int. Cl.⁴ .................... G01G 3/14; G01L 25/00; G01L 1/22
[52] U.S. Cl. .................... 177/211; 73/1 B; 73/862.65
[58] Field of Search ............ 177/211; 73/1 B, 862.65

[56] References Cited

U.S. PATENT DOCUMENTS

| | | | |
|---|---|---|---|
| 4,150,729 | 4/1979 | Ormond | 177/211 |
| 4,453,609 | 6/1984 | Griffen et al. | 177/211 |
| 4,478,093 | 10/1984 | Valadier | 177/211 X |

Primary Examiner—George H. Miller, Jr.
Attorney, Agent, or Firm—Richard Bushnell

[57] ABSTRACT

A flexion rod (1) has two through holes (2, 3) connected together by a hollow portion (4). Four weakened portions (5, 6, 7, 8) are thus formed in the rod (1). A quadruple strain gauge (9) is fixed to the rod (1) at a right angle with one (5) of said weakened portions, and in order to correct the inaccuracy of the measurements resulting from the presence of the quadruple strain gauge (9) at only one location of the rod (1), two calibrated notches (10, 11) are provided at a right angle with other weakened portions (7, 8).

3 Claims, 1 Drawing Sheet

FIG.1
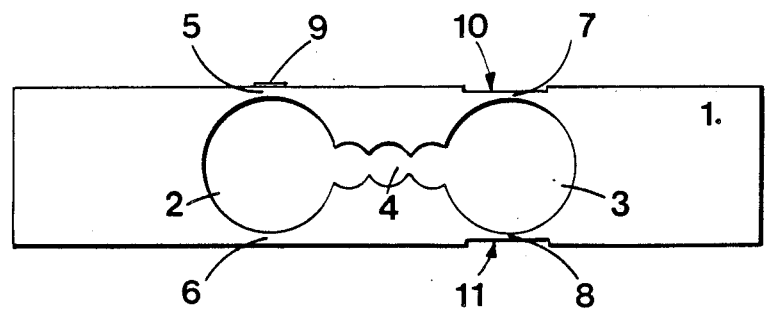
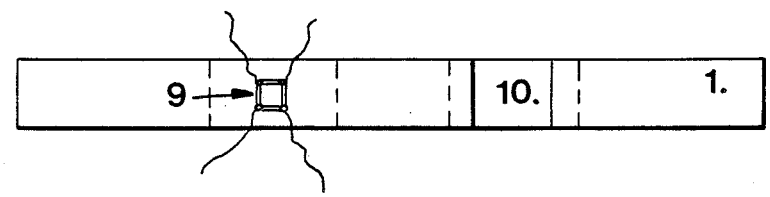
FIG.2

WEIGHING DEVICE FOR STRAIN GAUGES

BACKGROUND OF THE INVENTION

Weighing devices with strain gauges, commonly known as strain gauge weight sensors, are used, for example, in kitchen or bathroom scales. They include a metal rod or beam constrained at one end thereof, which rod is provided at certain locations along its length with weakened areas or hinges, where the metal is less thick than elsewhere. Strain gauges are fixed to this rod at a right angle with the weakened areas or hinges.

Amongst the above-mentioned sensors, there are the so-called "self supporting" or constant moment weight sensors with strain gauges of the paralellogram type, which sensors are associated with a load supporting tray and offer the particularity of giving a response totally independent of the position—i.e. of the offset—of the load on this tray.

These sensors of the paralellogram type used up to now, consist of four strain gauges, each mounted on one of four hinges of a machined test body. These four strain gauges are then connected together electrically through small leads to form a Wheatstone bridge, the terminals of which are in turn connected to a power supply and to two measuring leads. This type of sensor has the disadvantage of being long to manufacture because of the large number of wires required, and because of the complexity of the connections and of the binding of the gauges in different areas, which all results in high manufacturing costs. On the other hand however, this bridge arrangement of the gauges is self-compensating and renders the conventional sensors insensitive to the load being offset. When the load is offset, forces of the same intensity and sign are generated in the two upper hinges of the sensor. In the conventional sensor, these forces are measured on these two hinges by gauges of opposite sign (because they are juxtaposed in the Wheatstone bridge), whereby the sum of the values measured by these two gauges equals zero; the same phenomenon occurs (with two forces of opposite sign) on the lower hinges. In theory, the self-compensation should be perfect. In practice however, it was found that a small final adjustment was nearly always necessary. This is mainly due to three types of imperfections: imperfections in the machining of the test body, imperfections in the positioning of the gauges and, finally, to a lesser extent, imperfections in the homogeneity of the material from which the test body is made. These small imperfections can be corrected by slightly retouching the hinges of the sensor by machining, so as to modify the geometry of the paralellogram.

When using weight sensors in mass-produced items such as kitchen or bathroom scales, it is imperative to reduce manufacturing costs as much as possible. This is why the possibility of reducing significantly the cost of weight sensors with strain gauges was investigated. A cost reduction could be achieved by bonding side by side two gauges on two hinges (upper or lower) or on the two hinges near to a same end of the sensor. This would result in some simplification of the bonding operation, but the complexity of the wiring would remain, and the gain would only be negligible.

When other solutions were investigated, a major difficulty was encountered. Assemblies of four strain gauges already connected electrically together to form a complete Wheatstone bridge and mounted on a single support are already known. This bridge is bonded on one of the four hinges of the test body, thereby reducing significantly the bonding and wiring operations, and hence, manufacturing costs. However, this arrangement of the gauge bridge does not ensure the self-compensation which makes the conventional sensors with four separate gauges insensitive to the load being offset. The following comparison clearly shows the magnitude of the challenge :

The deviations in the reading (or error) of the sensors when the offset of load on the tray is maximum (before the final adjustment mentioned above) are as follows :

1. Case of the so-called self-compensating conventional sensor with four gauges (before the final adjustment) deviations less than 0.1 percent.
2. Case of a sensor with four hinges and a group of four sensors connected together in a Wheatsone bridge mounted on one support placed on one of the hinges: deviations of about 10 percent.

Thus, the error in the second case is at least a hundred times greater than in the first case, which is enormous and cannot be justified by cost reduction considerations.

THE INVENTION

The author of the present invention has nevertheless analysed thoroughly the problem and, quite unexpectedly, concluded that it was perfectly possible to overcome an obstacle which had seemed insuperable and to replace the Wheatsone bridge with four separate gauges by a bridge with a compact four gauge bridge mounted at only one hinge.

In fact, he was able to establish, that the significant effect observed when the load was offset could be corrected by proceeding to the removal of material at the location of certain hinges (in order to displace the neutral axis), others than the one at which the four gauge bridge is fixed.

He was able to determine the exact amount of material that needed to be removed to ensure such a correction, and the following result was attained :

3. A sensor with a four gauge bridge on one support mounted at a right angle with one of the hinges, two hinges retouched by machining during manufacturing (before the final adjustment): deviations less than 0.1 percent, i.e. the same as in the case of the conventional sensor.

This surprising and unexpected result indicates that it is possible to decrease significantly the manufacturing costs of the sensor, provided an additional milling operation is performed during manufacture which is simple and of a negligible cost.

The effect of the load being offset can be corrected in one version by retouching only one hinge other than the one to which the multiple strain gauge, for example a four gauge bridge, is mounted.

Quite obviously, the residual inaccuracy, resulting from the three above-mentioned factors, can be precisely corrected in the conventional manner during the control and finishing operations.

Here, we only discussed the deviations experienced when the load is offset along the longitudinal axis of the sensor, because those experienced when the load is offset along the transverse axis (i. e. those acting torsionally on the sensor) are identical, whatever the type of sensor being considered, since they are all symmetrical with respect to a lengthwise oriented vertical plane.

The object of the present invention is a weighing device with strain gauges according to claim 1.

BRIEF DESCRIPTION OF THE DRAWINGS

The appended drawing illustrates, by way of example, an embodiment of the device according to the invention.

FIG. 1 is a side view thereof;

FIG. 2 is a top view corresponding to FIG. 1.

PREFFERED EMBODIMENT OF THE INVENTION

The device illustrated comprises, similarly to other known devices with strain gauges for measuring forces, a metal rod designed to be constrained at one end in the frame, for example, of kitchen or bathroom scales, the other end receving a tray for supporting the load.

This rod has two through holes 2, 3 of a circular shape, connected together by a slot 4, made simply by milling, or by boring overlapping holes. Thus, the rod 1 has four weakened areas 5, 6, 7 and 8 providing the hinges.

The device illustrated differs from those known in the art in that, instead of having four separate strain gauges each fixed on one of the four weakened portions 5, 6, 7, 8, it is provided with a multiple strain gauge 9, made from four separate gauges connected together electrically to form a bridge and fixed to a common support fixed on the rod, a lead being shown soldered to each end of the bridge.

The inaccuracy of the measurements resulting from the replacement of four separate strain gauges, arranged symmetrically with respect to a plane, by a single quadruple gauge fixed on the weakened portion 5 of the rod 1 defined by the hole 2 can be determined before a batch is produced, and also the amount of material which needs to be removed from the rod 1 at the weakened portions 10 and 11 defined by the hollow 3, for precisely correcting the inaccuracy of the measurements. It is therefore easy to carry out the correction which is required during manufacturing, in a single accurate milling operation, therefore implying only negligible additional costs.

The usual small and final correction, necessary because of the various imperfections of the actual item, will be carried out as with known devices, through the removal of a very small amount of material from the holes 2 and 3, at the location of the weakened areas 5, 6, 7 8, with the result that exactly the same accuracy will be achieved with the device described herein as with the known so-called "self-supporting" weight sensors with strain gauges of the paralellogram type.

As indicated above, the hollows provided at the weakened portions 10, 11 can be achieved through the use of conventional machining techniques, such as the removal of material by milling. Other methods can be used for obtaining such hollows, in particular drawing methods.

What is claimed is:

1. A weighing device with strain gauges comprising a metal rod (1) designed to be constrained at one end and to receive a load supporting tray at the other end, provided with through holes (2, 3) at certain locations along its length defining in said rod weakened portions (5, 6, 7, 8) to provide hinges, said holes being connected together by a hollow portion (4), characterized in that it comprises a multiple strain gauge (9) fixed on the rod (1) at one of said weakened portions (5, 6, 7, 8) and in that the rod (1) has notches (10, 11) at a right angle with certain other weakened areas (7, 8), thereby displacing their neutral axis, said notches being calibrated to correct the inaccuracy observed when the load is offset, due to the gauges being formed as a single compact assembly at one location on the rod (1).

2. A device according to claim 1, characterized in that the multiple strain gauge (9) is fixed to a weakened portion (5) of the rod (1) defined by one (2) of said hollows, while said notches (10, 11) are made in the two weakened portions (7, 8) defined by the other hole (3).

3. A device according to claim 1, characterized in that a single notch (11) is made on a hinge, other than the one bearing the multiple strain gauge (9).

* * * * *